O. C. VERMILYA.
LOCKING DEVICE FOR AUTOMOBILES.
APPLICATION FILED JAN. 11, 1918.
1,286,454.
Patented Dec. 3, 1918.
2 SHEETS—SHEET 1.
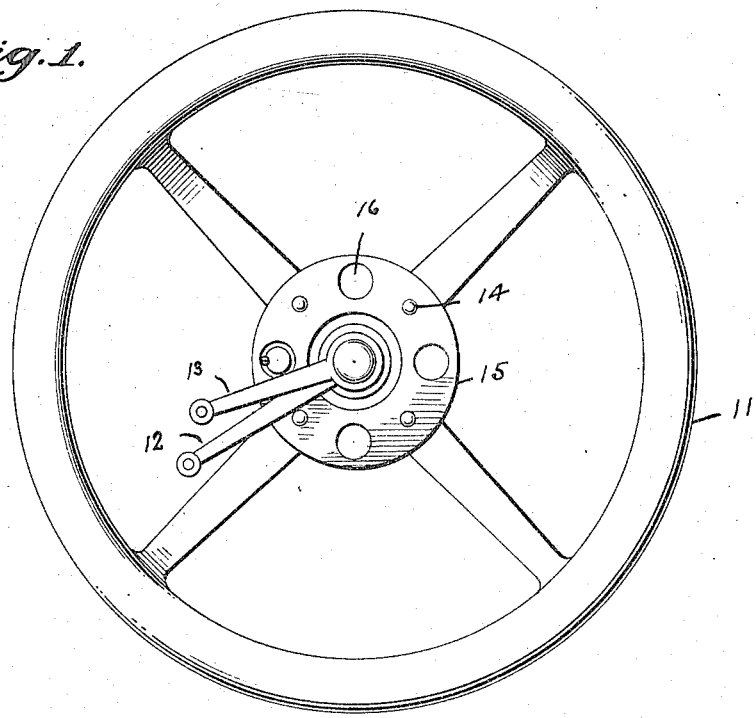
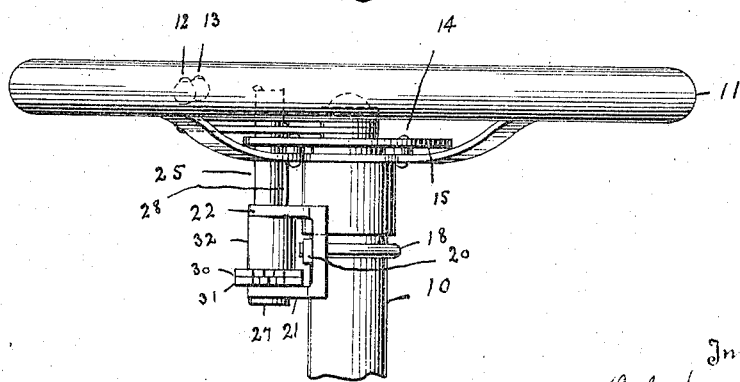

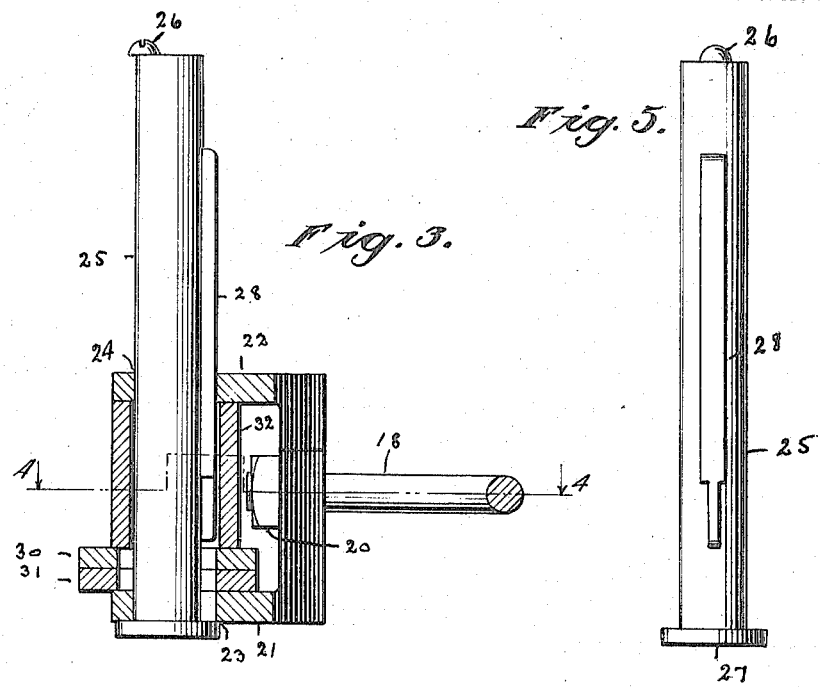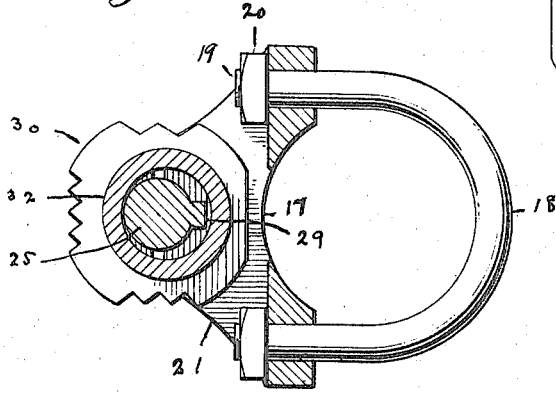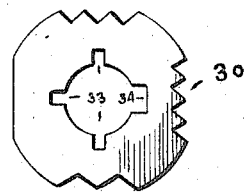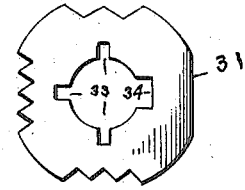

UNITED STATES PATENT OFFICE.

OWEN C. VERMILYA, OF FREMONT, OHIO.

LOCKING DEVICE FOR AUTOMOBILES.

1,286,454. Specification of Letters Patent. Patented Dec. 3, 1918.

Application filed January 11, 1918. Serial No. 211,417.

*To all whom it may concern:*

Be it known that I, OWEN C. VERMILYA, citizen of the United States, residing at Fremont, in the county of Sandusky and the State of Ohio, have invented new and useful Improvements in Locking Devices for Automobiles, of which the following is a specification.

The present invention relates to improvements in means to lock the steering mechanism and the spark and throttle levers of an automobile so as to prevent the unauthorized putting in motion thereof.

The primary object of my invention is to provide a simple, compact and durable device which may be easily handled and manipulated and which when properly associated with the steering wheel and the spark and throttle levers and locked in such position will prevent lateral movement thereof.

A further object of my invention is to provide a device of the above character having a bolt which is movable in a plane parallel to that of the steering post and which extends upwardly through the spokes of the steering wheel and prevents lateral movement of said wheel and of the spark and throttle levers, said bolt being adjustable by means of a keyless lock.

Various other objects and advantages will become apparent during the continuance of the following description.

In the drawings:

Figure 1 is a top view of the steering post and steering wheel of an automobile with my device attached.

Fig. 2 is a side elevation of a steering post and steering wheel with my device attached.

Fig. 3 is a longitudinal section of my device, not including the circular piece of metal shown in Fig. 1.

Fig. 4 is a view in cross section taken on line 4—4 of Fig. 3.

Fig. 5 is a view of the bolt employed in my device.

Fig. 6 is a view of one of the permutation disks employed in my device.

Fig. 7 is a view of the other permutation disk employed.

More in detail, I have shown in the drawings a steering post 10 surrounded by a steering wheel 11 which has the usual spokes and operating above it the spark and throttle levers 12 and 13 respectively. Beneath these levers and riveted as at 14 to the spokes of the wheel, I provide a circular piece of metal 15 having a series of spaced holes 16 the purpose of which will be later on set forth.

That part of my device beneath the steering wheel consists of a member 17 whose base is curved in such a manner that it fits snugly against the steering post 10 and is held tightly against said post by a yoke 18 whose screw threaded ends 19 carry nuts 20, permitting the device to be attached or detached at will. The member 17 is so formed that it has extending outwardly and perpendicular to the steering post, two uprights or supports 21 and 22. Upright 21 is provided with a hole 23 and upright 22 is provided with a hole 24, said holes being in exact alinement and being employed to carry a bolt 25, which moves longitudinally in a plane parallel to that of the steering post 10. A screw 26 is so arranged in the end of the bolt 25 that it will stop the downward movement of said bolt by engaging the upright 22 and head 27 also carried by said bolt, by engaging the shoulder 21 prevents too much upward movement. The bolt also carries a longitudinal key 28 which operates in the cut out portions 29 of the uprights 21 and 22. As will be observed from the drawings this key is narrower at its lower end than at its upper end, the purpose of this being to permit the bolt to be properly adjusted by the two permutation disks 30 and 31 which are carried between the uprights 21 and 22. It is to be understood that I do not confine myself to this particular form of key as several keys may be employed to obtain the desired results. A washer 32 is provided to keep the disks positioned against the upright 21. The disks 30 and 31 may be equipped with slots, the form and number of which may be varied at will. In Figs. 6 and 7 are shown slots 33 and 34 only one of which, 34 is sufficiently large to allow the complete passage through of the key 28, so that when the disks are so turned that this slot in one of them is in proper registry with the corresponding slot in the other, the key 28 will pass freely through and allow the bolt to be lowered until the screw 26 comes in contact with the upright 22.

It will be seen therefore that when the device is properly positioned upon the steering post of an automobile the bolt 25 may be pushed upward to its fullest extent and adjusted against the spark and throttle levers. By turning the disks so that they are not in registry the bolt is held in this position and while so positioned will prevent the lateral movement of the steering wheel or either of the levers.

By adjusting the disks so that free passage is allowed the key 28 the bolt 25 will be lowered and the levers may then be operated at will.

In order to render the device still more effective the circular piece of metal 15 mentioned above is placed upon the steering wheel as shown in the drawing in such a manner as to allow the bolt 25 to pass through the hole 16.

Having thus fully described my invention what I claim as new and desire to protect by Letters Patent is:

The combination with a steering post and steering wheel, of a locking device comprising a base, curved to conform to said post, and provided with a yoke to hold it in position; spaced upright members accommodating a longitudinally disposed bolt, equipped with an overlapping screw at one end; means to adjust said bolt consisting of a longitudinal key carried thereby and slotted disks adapted to coöperate with said key, and a perforated ring carried above the wheel, to engage said bolt and lock the wheel and the levers positioned thereon against lateral movement.

OWEN C. VERMILYA.

Witnesses:
J. M. HALL,
CHAS. W. DAVIS.